United States Patent [19]

Armentrout et al.

[11] Patent Number: 5,553,483
[45] Date of Patent: Sep. 10, 1996

[54] LEAK DETECTION SYSTEM

[75] Inventors: Charles J. Armentrout, Ann Arbor; Carl E. Strandberg, Troy, both of Mich.

[73] Assignee: Pilot Industries, Inc., Dexter, Mich.

[21] Appl. No.: 515,270

[22] Filed: Aug. 15, 1995

[51] Int. Cl.[6] .................................................. G01M 3/04
[52] U.S. Cl. .................................................. 73/40; 73/40.7
[58] Field of Search .................................. 73/40, 40.7

[56]  References Cited

U.S. PATENT DOCUMENTS

| | | | |
|---|---|---|---|
| 3,186,214 | 6/1965 | Roberts | 73/40 |
| 4,195,224 | 3/1980 | Sanger et al. | 250/281 |
| 4,534,204 | 8/1985 | Berquist | 73/1 |
| 5,386,717 | 2/1995 | Toda | 73/40.7 |
| 5,457,316 | 10/1995 | Cohen et al. | 250/286 |

*Primary Examiner*—Hezron E. Williams
*Assistant Examiner*—Jay L. Politzer
*Attorney, Agent, or Firm*—Gifford, Krass, Groh, Sprinkle, Patmore, Anderson & Citkowski, P.C.

[57]  ABSTRACT

A system for detecting a leak in a part having an interior cavity and at least one opening open to the interior cavity in which the interior cavity is pressurized with a preselected gas. The part is positioned within the test chamber while a carrier gas flows across the pan so that the carrier gas becomes intermixed with the preselected gas, if any, escaping through leaks in the pan. The gas flows directly through a turbulator which ensures homogenous mixing of the carrier gas and preselected gas, if present, and a baffle then converts the turbulent gas flow to a laminar gas flow. A gas sensor then detects the presence of the preselected gas in the laminar gas flow, indicative of the leak in the pan, and generates an appropriate output signal indicative of the presence of a leak in the pan.

20 Claims, 2 Drawing Sheets

LEAK DETECTION SYSTEM

BACKGROUND OF THE INVENTION

1. Field of the Invention

The present invention relates to a leak detection system for a part having an interior cavity.

2. Description of the Prior Art

There are many previously known systems for detecting leaks in parts having an interior cavity. In many of these previously known systems, the part is pressurized with a preselected gas, such as helium, and placed within a closed chamber. The chamber has been evacuated and a gas detector coupled to the chamber detects the presence of the preselected gas within the evacuated test chamber. The presence of the preselected gas in the gas chamber after evacuation, of course, is indicative of a leak in the part under test.

A second known system has the vacuum inside the part and helium is introduced in small puffs about the exterior. Presence of helium in the evacuated interior indicates a leak in the part near where the helium was last introduced. This kind of testing apparatus cannot be calibrated for actual leak rate and size of hole due to uncertainty in the quantity of applied helium.

A third known system is called a "helium sniffer" detector. The pan is pressurized with helium and a small probe attached to the helium mass spectrometer is moved about the exterior. Wherever a hole exists between the exterior surface and interior cavity, the helium detector will register a positive signal. In general, for all possible test geometries, this kind of system cannot be given an absolute leak rate calibration.

These previously known leak detection systems, however, are not well suited for high production leak testing of the type required by EPA regulations for the automotive industry. Under such regulations, parts are deemed unacceptable if they leak the working fluid at rates in excess of some threshold value. Parts with leaks below this threshold are deemed acceptable. The aforementioned systems are meant to check for fully hermetic seals. Many of these previous systems cannot be calibrated in any way and are incapable of detecting a threshold leak rate greater than zero. Of the types that can be calibrated to absolute leak rate, the systems require a hard vacuum to assure consistent results. In particular, the disadvantages of such systems that can be calibrated are their complex vacuum pumping apparatus and their required time during production testing to evacuate the test chamber to operating vacuums. The previous detection systems are much more demanding than necessary. Those systems use fully evacuated chambers with high mechanical complexity and reduced reliability.

SUMMARY OF THE PRESENT INVENTION

The present invention provides a leak detection system which overcomes all the above-mentioned disadvantages of the previously known devices.

In brief, in the present invention, the normal or expected openings of the part are plugged and the interior chamber or cavity of the part is then pressurized with a preselected gas, such as helium. The part is then placed within the test chamber as in the previously known systems.

Unlike the previously known systems, however, the test chamber is not evacuated but, instead, positively pressurized with a carrier gas different from the preselected gas. An exhaust passageway is open to the test chamber so that the carrier gas flow together with any of the preselected gas leaking from the part flows through the exhaust passageway.

A turbulator is positioned within the exhaust passageway to ensure complete intermixing of the carrier gas and preselected gas, if present, so that a homogenous mixture of these gases is produced. A baffle then converts the turbulent gas flow to a laminar gas flow and this laminar gas flow passes across a gas sensor sensitive to the preselected gas. In the event that the gas sensor detects the preselected gas in the laminar gas flow at concentrations above a predetermined threshold, indicative of an unacceptably high rate of leak in the pan, the gas sensor activates an appropriate signal to the system operator. The carrier gas and preselected gas, if present, is then exhausted to the atmosphere and the test is completed.

The present invention provides for absolute calibration as to helium leak rate by the presence of a calibration channel of known leak rate installed into the cavity 22. When a test gas such as helium is cycled onto the calibration channel, the detector 50 measures a signal which provides the absolute measurement needed to allow the invention to measure threshold leak rates.

Alternatively, the test chamber is pressurized with the preselected gas while the carrier gas is flowed through the test pan. In this alternate embodiment, if a leak is present, the preselected gas flows into the pan rather than vice versa.

BRIEF DESCRIPTION OF THE DRAWING

A better understanding of the present invention will be had upon reference to the following detailed description, when read in conjunction with the drawing wherever like character references refer to like parts throughout the several views and in which.

DETAILED DESCRIPTION OF A PREFERRED EMBODIMENT OF THE PRESENT INVENTION

Figure 1:
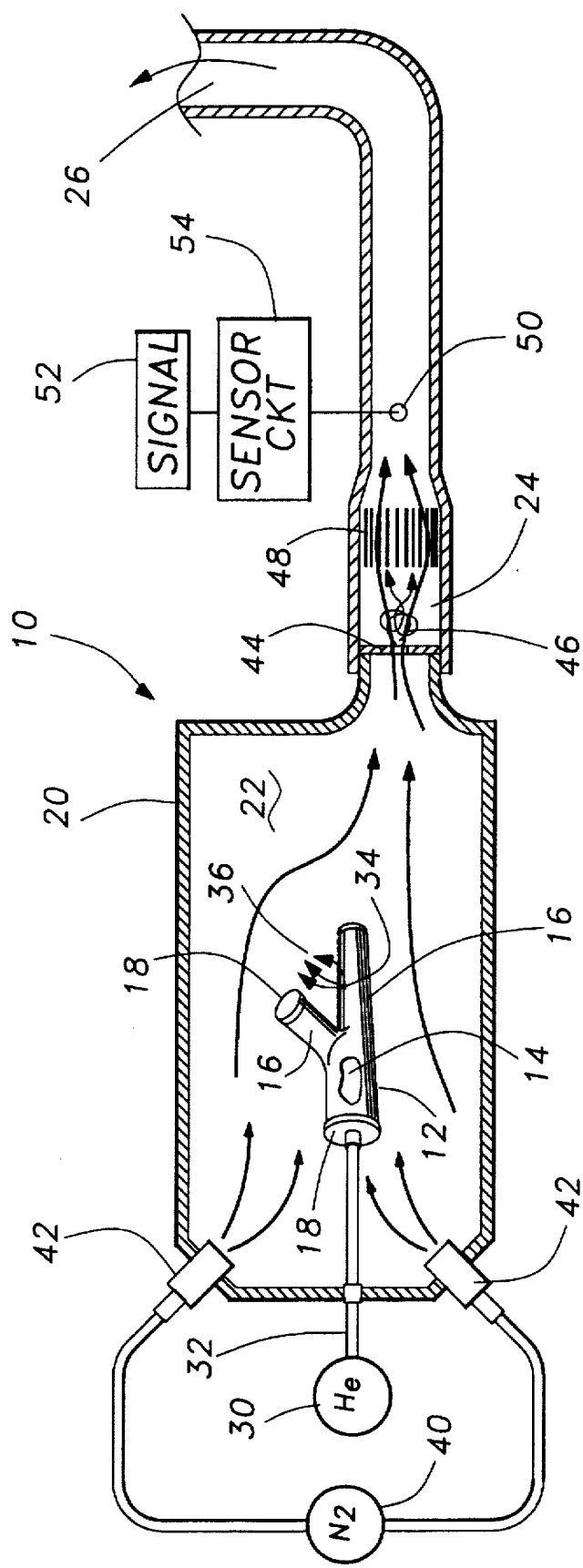
FIG. 1 is a diagrammatic view representing a first preferred embodiment of the invention.

With reference to FIG. 1, a first preferred embodiment of the leak detection 10 of the present invention is there shown for detecting leaks in a part 12 having an interior chamber 14. The part includes a number of normal openings 16 and each of these openings 16 are closed by a plug 18.

The part 12 is positioned within a closed or closable housing 20 which defines a test chamber 22 surrounding the part 12. A fluid passageway 24 is open at one end to the chamber 22 and at its other end to an outlet 26 which exhausts to atmosphere.

With the part 12 mounted within the chamber 22, a source 30 of a preselected gas, such as helium, is fluidly connected by a conduit 32 to the part chamber 14 and, in doing so, pressurizes the part chamber 14 with the preselected gas. Assuming that the part 12 is leak free, all of the preselected gas remains within the chamber 14 and does not enter the test chamber 22. Conversely, if the part 12 contains a leak, such as a leak 34, a portion of the preselected gas enters the test chamber 22 as indicated by arrows 36.

Simultaneous with the pressurization of the part chamber 14 with the preselected gas, a source 40 of a carrier gas different than the preselected gas is introduced into the test chamber 22 through one or more nozzles 42 such that the source 40 of carrier gas creates a small positive pressure within the test chamber 22. Additionally, the nozzles 42, as well as the test chamber 20 are designed to prevent areas of gas flow stagnation around the part 12.

Any conventional carrier gas can be used as long as the carrier gas is different than the preselected gas. For example, nitrogen and argon both form two gases which can be used as the carrier gas.

Since the carrier gas creates a slightly positive pressure within the test chamber 22, the carrier gas intermixed with any of the preselected gas which may have escaped from the part cavity 14 flows through the fluid passageway 24 and to the outlet 26. A turbulator 44 is provided at the inlet to the passageway 24 which creates turbulence in the airflow as indicated by arrows 46 to ensure complete and homogenous mixing of the carrier gas with any of the preselected gas that may have escaped from the part cavity 14. The turbulator 44 forms a means for creating turbulence of the gas flow. Furthermore, though any conventional turbulator may be utilized, such as a swirl turbulator or the like, as shown, the turbulator 44 comprises an abrupt port restriction immediately followed by an expansion in the passageway 24.

A baffle 48 is provided within the fluid passageway 24 downstream from the turbulator 44 and forms a means for converting the turbulent flow from the turbulator 44 to a laminar gas flow which is more suitable for gas sensors. The baffle 48 preferably is so constructed to provide the flowing gas with a Reynolds number of less than 2,500.

Downstream from the baffle 48, a gas detector 50 is introduced into the passageway 24 which is sensitive to the presence of the preselected gas in the laminar gas flow. In the event that the sensor 50 detects the presence of the preselected gas in the laminar gas flow above a predetermined threshold, indicative of an unacceptably high rate of leak in the part 12, the sensor 50 generates an output signal 52 through a sensor circuit 54 indicative to the operator that the part 12 had failed the leak test. The carrier gas and preselected gas, if present, is then exhausted out through the outlet 26 and the test is completed.

Figure 2:
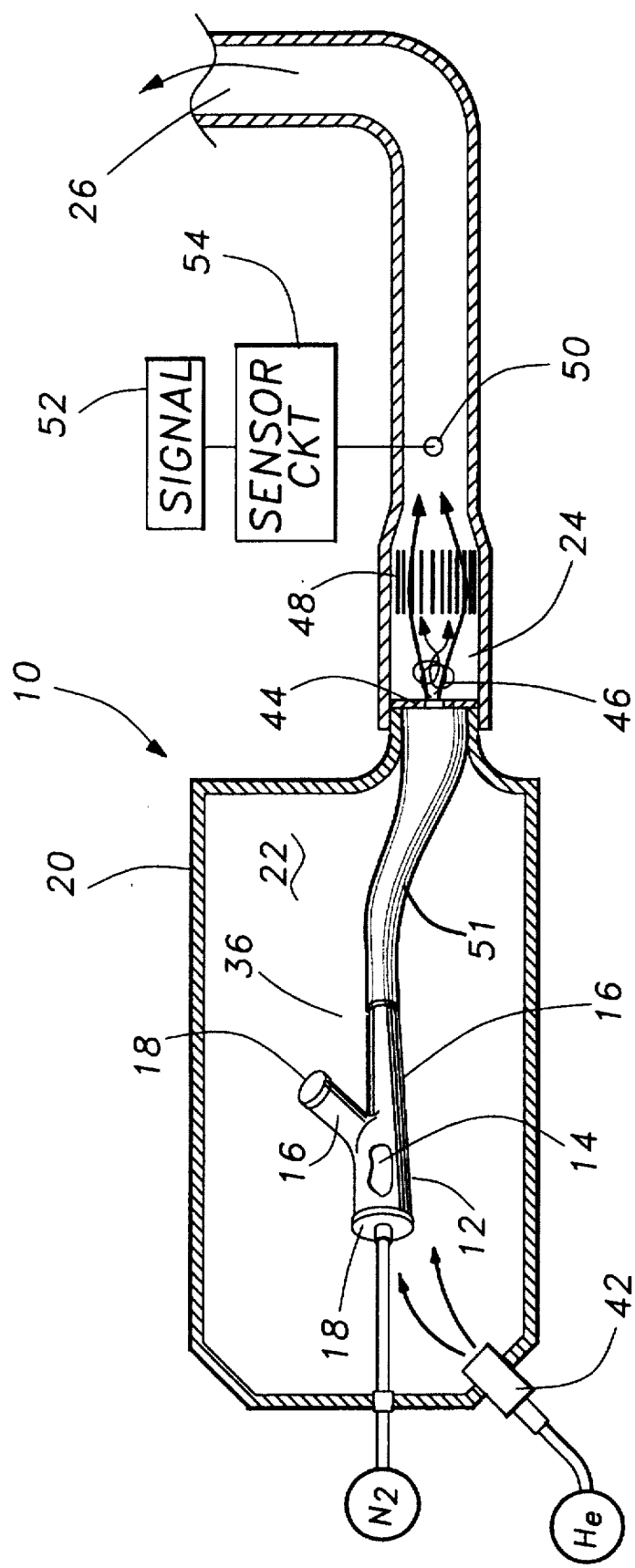
FIG. 2 is a view, similar to FIG. 1, but illustrating a second preferred embodiment of the invention.

With reference now to FIG. 2, a second preferred embodiment of the invention is there shown in which the test chamber 22 is closed and is pressurized with the preselected gas from the source 30. The carrier gas from the source 40 is then flowed through the part chamber 14 and a conduit 51 to the turbulator 44. Consequently, if a leak is present in the part 12, the preselected gas flows from the test chamber 22 into the part chamber 14, rather than vice versa, and intermixes with the carrier gas. The carrier gas and preselected gas, if present, then flows through the turbulator 44 and baffle 48 in the previously described fashion which, for brevity, will not be repeated.

From the foregoing, it can be seen that the present invention provides a positive pressure leak detection system for parts. Since the system of the present invention does not require evacuation of the test chamber like the previously known leak detection systems, the present system enjoys a much more rapid cycle time that is suitable for high volume production testing than the previously known systems.

Furthermore, the present invention enjoys reduced complexity, and thus enhanced reliability as compared to the previously known systems. Furthermore, the present invention is capable of being fully calibrated in leak rate, i.e. holes can be characterized.

Having described our invention, however, many modifications thereto will become apparent to those skilled in the art to which it pertains without deviation from the spirit of the invention as defined by the scope of the appended claims.

We claim:

1. A system for detecting a leak in a part having an interior cavity and at least one opening open to the interior cavity comprising:

a closable test chamber having an interior chamber in which the part is placed, a fluid passageway having one end open to said interior chamber of the test chamber and a second end open to atmosphere, means for pressurizing said cavity with a preselected gas, a pressurized source of a carrier gas, said carrier gas being different than said preselected gas, means for pressurizing said interior chamber of said test chamber to a sufficient pressure above atmospheric pressure with said carrier gas so that said carrier gas becomes intermixed with any of the preselected gas escaping from the interior cavity of the part and so that said carrier gas and any intermixed preselected gas flows through said passageway, means in said passageway, for detecting the presence of said preselected gas above a preselected threshold intermixed with said carrier gas.

2. The invention as defined in claim 1 and further comprising means for enhancing the intermixing of the carrier gas and preselected gas, if present.

3. The invention as defined in claim 2 wherein said enhancing means comprises means for creating turbulence of the carrier gas and preselected gas, if present, upstream from said detecting means.

4. The invention as defined in claim 3 and further comprising means for converting gas flow of said carrier gas and preselected gas, if present, to a laminar flow, said converting means being operatively positioned between said turbulence creating means and said detecting means.

5. The invention as defined in claim 4 wherein said converting means comprises a baffle.

6. The invention as defined in claim 4 wherein said turbulence creating means and said converting means are positioned in said fluid passageway.

7. The invention as defined in claim 1 wherein said preselected gas comprises helium.

8. The invention as defined in claim 1 wherein said carrier gas comprises nitrogen.

9. The invention as defined in claim 1 wherein said carrier gas comprises argon.

10. The invention as defined in claim 4 wherein said converting means has a Reynolds number less than 2,500.

11. A system for detecting a leak in a part having an interior cavity and at least one opening open to the interior cavity comprising:

a closable test chamber adapted to receive the part, means for pressurizing said test chamber with a preselected gas, a conduit forming an exhaust passageway and means for fluidly sealing one end of said conduit to the part so that said exhaust passageway is open only to said interior cavity of the part at said one end of said conduit, a second end of said conduit forming an exhaust outlet of said exhaust passageway to atmosphere, means for flowing a carrier gas through the part cavity so that said carrier gas becomes intermixed with any of the preselected gas entering said part cavity from the test chamber, said carrier gas being different than said preselected gas, means in said exhaust passageway for detecting the presence of said preselected gas above a preselected threshold intermixed with said carrier gas.

12. The invention as defined in claim 11 and further comprising means for enhancing the intermixing of the carrier gas and preselected gas, if present.

13. The invention as defined in claim 12 wherein said enhancing means comprises means for creating turbulence of the carrier gas and preselected gas, if present, upstream from said detecting means.

14. The invention as defined in claim 13 and further comprising means for converting gas flow of said carrier gas and preselected gas, if present, to a laminar flow, said converting means being operatively positioned between said turbulence creating means and said detecting means.

15. The invention as defined in claim 14 wherein said convening means comprises a baffle.

16. The invention as defined in claim 14 wherein said turbulence creating means and said converting means are positioned in said fluid passageway.

17. The invention as defined in claim 11 wherein said preselected gas comprises helium.

18. The invention as defined in claim 11 wherein said carrier gas comprises nitrogen.

19. The invention as defined in claim 11 wherein said carrier gas comprises argon.

20. The invention as defined in claim 14 wherein said converting means has a Reynolds number less than 2,500.

\* \* \* \* \*

UNITED STATES PATENT AND TRADEMARK OFFICE
CERTIFICATE OF CORRECTION

PATENT NO. : 5,553,483

DATED : September 10, 1996

INVENTOR(S) : Charles J. Armentrout and Carl E. Strandberg

It is certified that error appears in the above-indentified patent and that said Letters Patent is hereby corrected as shown below:

In the Abstract, lines 5, 7, 12, and 14, "pan" should be --part--.

Column 1, line 27, "pan" should be --part--.

Column 2, lines 13, 26, and 27, "pan" should be --part--.

Column 4, line 34, "convening" should be --converting--.

Column 6, line 2, "convening" should be --converting--.

Signed and Sealed this

Fourth Day of February, 199

Attest:

BRUCE LEHMAN

*Attesting Officer*                *Commissioner of Patents and Trademarks*